(12) United States Patent
Miura et al.

(10) Patent No.: US 6,641,890 B1
(45) Date of Patent: Nov. 4, 2003

(54) CARTRIDGE-CONTAINED RECORDING MEDIUM

(75) Inventors: Hiroshi Miura, Miyagi (JP); Hirokazu Odagiri, Miyagi (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 09/721,069

(22) Filed: Nov. 22, 2000

(30) Foreign Application Priority Data

Nov. 24, 1999 (JP) ............................................. 11-332627

(51) Int. Cl.[7] ................................................. G11B 5/66
(52) U.S. Cl. ..................... 428/64.2; 428/64.4; 428/64.6; 428/64.9; 428/64.8; 428/66.1; 428/694 T; 428/694 TS; 428/69 TM; 428/900
(58) Field of Search ............................... 428/64.2, 64.4, 428/64.6, 64.9, 64.8, 66.1, 694 T, 694 TS, 694 TM, 900

(56) References Cited

U.S. PATENT DOCUMENTS

| 5,776,575 A | * | 7/1998 | Hiraoka et al. | ............. 428/64.1 |
| 6,388,978 B1 | * | 5/2002 | Ogawa et al. | ............... 369/116 |
| 6,562,432 B2 | * | 5/2003 | Ogawa et al. | ............. 428/64.1 |

* cited by examiner

Primary Examiner—Leszek Kiliman
(74) Attorney, Agent, or Firm—Sonnenschein, Nath & Rosenthal LLP

(57) ABSTRACT

In a magneto-optical disc contained in a cartridge, a first dielectric layer, signal recording layer, second dielectric layer, and light reflecting layer are sequentially stacked on a substrate having formed grooves, and a first protective layer, print layer using at least one color and second protective layer are sequentially stacked on the light reflecting layer. Thickness of the second protective layer is not smaller than that of the print layer, and thickness of the first protective layer is not smaller than 2 $\mu$m. Thus the recording medium having the print layer on at least one surface maintains a sufficient resistance to corrosion and a good slidableness.

7 Claims, 2 Drawing Sheets

CARTRIDGE-CONTAINED RECORDING MEDIUM

RELATED APPLICATION DATA

The present application claims priority to Japanese Application No. P11-332627 filed Nov. 24, 1999, which application is incorporated herein by reference to the extent permitted by law.

BACKGROUND OF THE INVENTION

1. Field of the Invention

This invention relates to a cartridge-contained recording medium especially suitable for application to a disc contained in a cartridge and having a printed layer on at least one surface.

2. Description of the Related Arts

Magneto-optical recording is made by irradiating a laser beam onto a signal recording layer and simultaneously applying a magnetic field from a magnetic head in a record/reproduce apparatus. There is MD (Mini Disc), for example, as a magneto-optical recording medium used for such magneto-optical recording.

Magneto-optical recording mediums typically have a multi-layered structure sequentially stacking a first dielectric layer, signal recording layer, second dielectric layer and light reflecting layer on a substrate. Further formed on the light reflecting layer is a protective film.

Recently proposed was a magneto-optical recording medium with a colored protective film to conform to the consumer preference.

Magneto-optical recording mediums with colored protective films have more factors that appeal to one's eyes than conventionally used magneto-optical recording mediums. Therefore, they can meet user's requirements more easily. However, it was still difficult to distinguish products in accordance with increased demands from users for distinctiveness and progressively variable users' tastes.

As a method for meeting users' demands for distinctiveness and satisfying a variety of tastes, printing on disc planes was proposed.

However, printing on disc planes caused corrosion of discs by ink and degradation in accuracy of magnetic heads by deterioration of surface qualities derived from uneven printed planes.

OBJECT AND SUMMARY OF THE INVENTION

It is therefore an object of the invention to provide a cartridge-contained recording medium that has a sufficient resistance to corrosion even when a print is applied onto at least one surface of the recording medium and simultaneously has good slidableness.

According to the invention, there is provided a cartridge-contained recording medium in which a recording medium is contained in a cartridge, characterized in a first dielectric layer, a signal recording layer, a second dielectric layer, a light reflecting layer, a first protective layer, a print layer and a second protective layer are sequentially stacked on a base body of the recording medium; and the second protective layer has a thickness not smaller than that of the print layer.

In the present invention, for the purpose of improving resistance to corrosion of the recording medium and obtain good slidableness, thickness of the second protective film is preferably larger than that of the print layer.

In the present invention, for the purpose of ensuring a sufficient resistance to corrosion of the recording medium and forming a print layer on a good plane, thickness of the first protective film is typically not smaller than 2 $\mu$m.

In the present invention, for the purpose of preventing damages to the surface of the recording medium, thickness of the second protective film is typically not smaller than 5 $\mu$m.

In the present invention, for the purpose of ensuring the effect of sufficiently masking unevenness of the print layer and obtaining a good protective property and a good recording property, thickness of the second protective layer formed on the print layer is typically not beyond the range from 1.1 times to 2.0 times of the thickness of the print layer, and preferably not beyond the range from 1.2 times to 1.5 times of the thickness of the print layer.

In the present invention, total thickness of the first protective layer, print layer and second protective layer is typically from 12 $\mu$m to 20 $\mu$m.

In the present invention, for the purpose of maintaining a print clean, if at lest two or more colors are used on the print layer, thickness of the print layer is typically from 3 $\mu$m to 8 $\mu$m, and preferably from 5 $\mu$m to 6 $\mu$m. Furthermore, in the present invention, if a single color is used on the print layer, thickness of the print layer is typically from 1 $\mu$m to 3 $\mu$m. In the present invention, for the purpose of improving visibility of printed colors, a white-colored layer is typically provided as a base layer of the print layer.

According to the cartridge-contained recording medium having the above-summarized configuration according to the invention, since the protective film formed on the print layer has a thickness not smaller than that of the print layer, possible unevenness of the print layer can be sufficiently masked by the second protective layer, and the recoding medium can be improved in smoothness of its surface.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
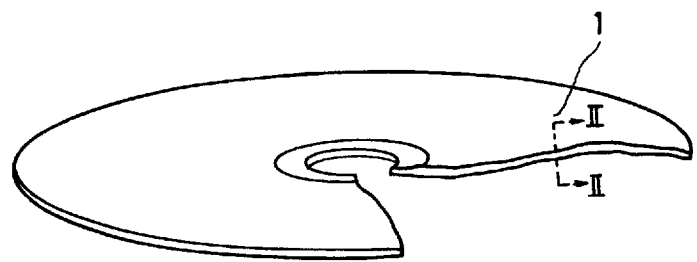
FIG. 1 is a perspective view of a magneto-optical disc according to the first embodiment of the invention.

Explained below is an embodiment of the invention with reference to the drawings. In all of the figures illustrating the embodiment shown below, the same or equivalent parts of elements are labeled with common reference numerals.

First made is an explanation about a magneto-optical disc contained in a cartridge, according to the first embodiment of the invention. This magneto-optical disc according to the first embodiment is shown in FIG. 1, and a cross-sectional structure taken along the II—II line of FIG. 1 is shown in FIG. 2.

As shown in FIG. 1, the magneto-optical disc 1 according to the first embodiment has the form of a disc.

Figure 2:
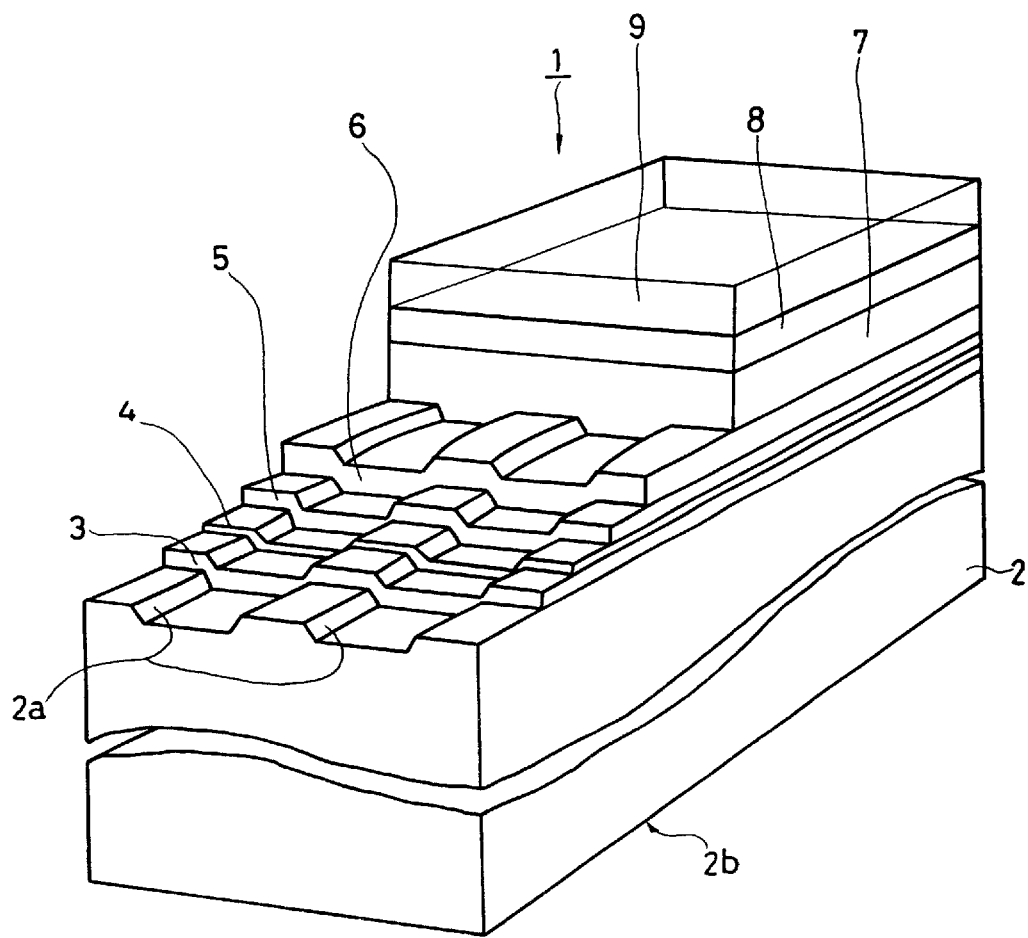
FIG. 2 is a perspective, cross-sectional view of a portion of the magneto-optical disc, taken along the II—II line of FIG. 1.

As shown in FIG. 2, the magneto-optical disc 1 according to the first embodiment is made by sequentially stacking a first dielectric layer 3, signal recording layer 4, second dielectric layer 5, light reflecting layer 6, first protective layer 7, print layer 8 and second protective layer 9 on a substrate 2.

The substrate 2 is a disc-shaped member made of a hard material transparent to laser beams. Usable as the hard material forming the substrate 2 are resins and glass. More specifically, polycarbonate resin, acrylic resin or polyolefin resin, for example, is used as a resin material, and quartz glass, for example, is used as a glass material. In the embodiment shown here, the substrate 2 is made of polycarbonate resin, for example.

The substrate has formed a plurality of grooves 2a. The grooves are concentric and parallel with each other on the surface of the substrate 2, and are configured to meander over a fine width with a constant period in the radial direction of the substrate 2.

The first dielectric layer 3 is made of a material which is transparent to laser beams projected upon recording or reproduction of signals but does not allow oxygen ($O_2$) and water molecules ($H_2O$) to pass through. More specifically, the first dielectric layer 3 is preferably made of a material not containing oxygen, and it is therefore made of silicon nitride ($Si_3N_4$, SiN) or aluminum nitride (AlN). In the embodiment shown here, the first dielectric layer 3 is made of SiN, for example. The first dielectric layer 3 may be made by using a film-making technique such as sputtering, for example.

The signal layer 4, which is a thin film stacked on the first dielectric film 3, includes at least a magneto-optical recording layer. More specifically, used as the signal recording layer 4 is a single-layered or multi-layered magneto-optical recording layer or a multi-layered structure including a magneto-optical recording layer and a dielectric layer, which is proposed for CAD (center aperture detector) discs or MSR (Magnetically induced Super Resolution) discs. The magneto-optical recording layer of the signal recording layer 4 is made of a material which is inverted in magnetization in an external magnetic field when its coercive force decreases by an increase of the temperature to above a Curie temperature and has magneto-optical properties such as Kerr effect and Faraday effect. More specifically, the magneto-optical recording layer is made of an alloy of rare earth metals and transition metals, such as TbFeCo, TbFeCoCr, or GdFeCo, for example. In the embodiment shown here, the signal recording layer 4 is made of TbFeCoCr, for example.

The second dielectric layer 5 is a thin film stacked on the signal recording layer 4, and it is made of any one of the materials usable as the first dielectric layer 3.

The light reflecting layer 6, which is a thin film stacked on the second dielectric layer 5, is made of a material using one of non-magnetic metal elements or one of their compounds, independently, or combining them, such as gold (Au) or Al, for example. In the embodiment shown here, the light reflecting layer 6 is made of Al, for example. The light reflecting layer 6 functions to reflect laser beams sequentially passing through the signal recording layer 4 and the second dielectric layer 5. The light reflecting layer 6 also has a function as a heat sink for radiating heat generated in the signal recording layer 4 by laser beams projected toward the signal recording layer 4.

The first protective layer 7 in form of a thin film stacked on the light reflecting layer 6 is made of an ultraviolet-setting resin, for example. Thickness of the first protective layer 7 is adjusted to be not smaller than 2 $\mu$m. In this particular embodiment, it is 2.5 $\mu$m, for example. The first protective layer 7 may be made by curing a material coated by spin coating using a spin coater, for example. The first protective layer 7 functions to prevent deterioration of the underlying light reflecting layer 6 and signal recording layer 4 by oxidation, and functions to prevent damages to the first dielectric layer 3, signal recording layer 4, second dielectric layer 5 and light reflecting layer 6 on the substrate.

As the first protective layer 7, it is possible to use one coated with or containing.

The print layer 8 is made of an ultraviolet-setting resin ink (UV ink) hardened by irradiation of ultraviolet rays, for example. Thickness of the print layer 8 is determined typically in the range from 3 to 8 $\mu$m, preferably in the range from 5 to 6 $\mu$m. In the embodiment shown here, it is 5 $\mu$m, for example. Usable as a technique for making this print layer 8 is screen printing or offset printing. In addition to those, other printing techniques such as ink jet printing using water-color ink, for example, and electronic photography using fine-grain powder like a toner, for example, are also usable for making the print layer 8. These techniques make it possible to very delicate, high-fidelity printing, and contribute to remarkable improvement of the texture of the magneto-optical disc 1.

The second protective layer 9 stacked on the print layer 8 is made of the same ultraviolet-setting resin as that of the first protective layer 7. According to the Inventor's knowledge, if the second protective layer 9 is excessively thin, its masking function does not work sell and remains reflecting unevenness in level of the print layer 8. Therefore, thickness of the second protective layer 9 is determined to be not smaller than the thickness of the print layer 8. Preferably, thickness of the second protective layer 9 is in the range from 1.1 time to 2.0 times of the thickness of the print layer 8, and more preferably in the range from 1.2 times to 1.5 times of the thickness of the print layer 8. In the embodiment shown here, in which the print layer 8 is 5 $\mu$m thick, for example, thickness of the second protective layer 9 is determined to be not smaller than 5 $\mu$m, for example, to be 6 $\mu$m, as being 1.2 times the thickness of the print layer 8.

Total thickness of the first protective layer 7, print layer 8 and second protective layer 9 should not be as large as making it difficult to obtain a test signal, namely, not larger than 20 $\mu$m or more preferably in the range from 12 to 20 $\mu$m, for example. In this embodiment, total thickness of the first protective layer 7, print layer 8 and second protective layer 9 is 13.5 $\mu$m (2.5+5+6), for example, and individual thicknesses of the first protective layer, print layer 8 and second protective layer 9 are chosen under that condition.

Next made is an explanation about the aspect of the magneto-optical disc 1 having the above configuration contained in a cartridge.

Figure 3:
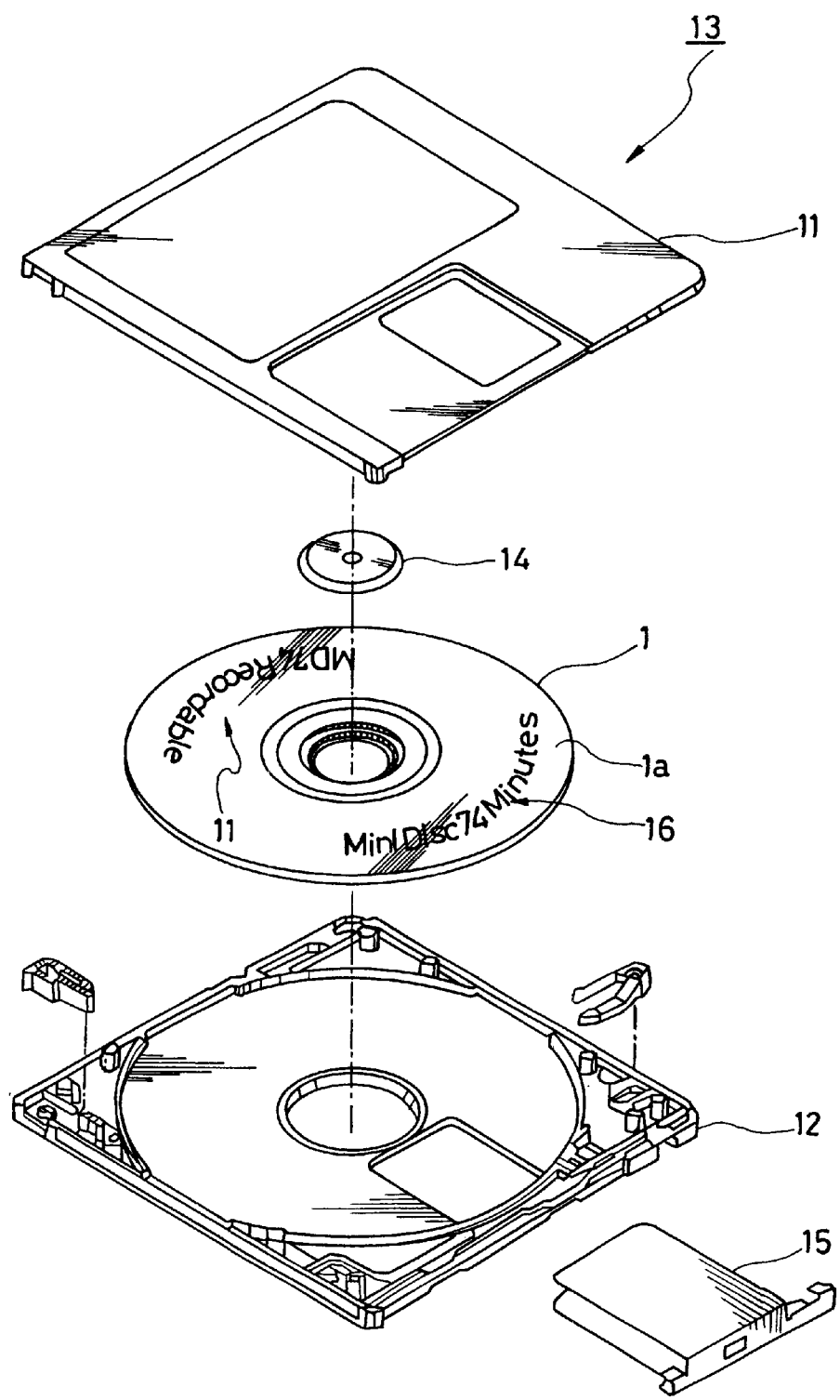
FIG. 3 is an exploded, perspective view that shows a cartridge and a magneto-optical disc contained in the cartridge according to the first embodiment of the invention.

As shown in FIG. 3, the magneto-optical disc 1 according to the embodiment is contained in a housing (cartridge) 13 made by combining an upper shell 11 and a lower shell 12. The magneto-optical disc 1 can rotate inside the cartridge 13, and a metal plate 14 for the chucking purpose is provided at its center. In a part of the cartridge 13, a shutter 15 is provided and configured to open and close at least upon reproducing and recording information with the magneto-optical disc 1.

The cartridge 13 is configured to give external sight of at lest a part of printed information 16 like character information or design information the print information of the print layer 8 formed on one or both surfaces of the magneto-optical disc 1. That is, a part or all of the shell confronting at least one of surfaces of the magneto-optical disc 1 having formed the print layer 8 is made of colorless or colored transparent material such as plastic. More specifically, as shown in FIG. 3, a part of the upper shell 11 confronting the surface 1a of the magneto-optical disc 1 bearing the printed information 16, through which at least a part of the printed information 16 can be seen from the exterior of the cartridge 13, is made of a colorless or colored transparent material. This is also for lower shell 12.

The magneto-optical disc 1 contained in the cartridge 13 having the above-explained configuration is supplied to a user as MD, for example.

The magneto-optical disc 1 contained in the disc cartridge is configured to be removably inserted into a record/reproduce apparatus (not shown) including a magnetic head or optical head. Then, with this record/reproduce apparatus, the magneto-optical disc 1 can undergo recording and reproduction over a plurality of times.

Next explained are record/reproduce operations of the magneto-optical disc 1.

In order to record a record signal on the magneto-optical disc 1 by using a record/reproduce apparatus, a laser beam of a predetermined output power is irradiated from an optical head onto a surface 2b of the disc-shaped substrate 2 opposite from the surface carrying the signal recording layer 4, and a magnetic field corresponding to the recording signal is applied from a recording magnetic head (not shown) onto the surface having the signal recording layer 4. Then, the coercive force is decreased by increasing the temperature of the signal recording layer 4 of the magneto-optical disc 1 by the laser beam. Under the condition with a decreased coercive force, a magnetic domain corresponding to the recording signal is recorded on the signal recording layer 4 by the magnetic field applied from the recording magnetic head.

In order to reproduce a recording signal from the magneto-optical disc 1 having a signal recorded on its signal recording layer 4 by using a record/reproduce apparatus, a laser beam with an output power weaker than he laser light used for recording is irradiated onto the magneto-optical disc 1 from a pickup (not shown). This laser beam is reflected by the light reflecting layer 6 of the magneto-optical disc 1, reflecting the status of the record/reproduce layer 4. The reflected laser beam (return beam) contains polarization due to a magneto-optical effect such as Kerr effect and Faraday effect. Then, polarization direction of the return beam is detected by the record/reproduce apparatus, and direction of the magnetic field in the magnetic domain recorded on the signal recording layer is detected. Through those operations, recording signals are reproduced.

The magneto-optical disc 1 is configured to conduct recording/reproduction of signals on or from the signal recording layer 4 along the groove 2a. For this reason, recording tracks are formed along grooves 2a.

As already explained, the grooves 2a have periodically meandering forms. And, they are configured such that a record/reproduce apparatus can read the period of the meandering grooves 2a of the magneto-optical disc 1 during record/reproduce operation of magneto-optical disc 1 with a laser beam. Then, by reading the periodical meanders of the grooves 2a, the record/reproduce apparatus can maintain the rotating sped of the magneto-optical disc 1 in a normally stable condition.

The grooves 2a are also used as a positional reference upon recording or reproducing signals on or from the signal recording layer 4 in the record/reproduce apparatus. That is, the grooves 2a have the function of indicating recording position (address) of a signal on the magneto-optical disc 1. Because of this function, by reading an address based on a groove 2a upon recording or reproduction of the magneto-optical disc 1, the record/reproduce apparatus can precisely fix the position for recording or reproduction in a short time.

The Inventor made various experiments with magneto-optical discs 1 according to the invention having the above-explained configuration. They are outlined below.

The Inventor prepared magneto-optical discs (MDs) by using substrates 2 having the diameter of 64 mm, for example, as an example of magneto-optical discs 1, and changing thicknesses of the first protective layer 7, print layer 8 and second protective layer 9 in various values, the Inventor conducted experiments about resistance to corrosion, slidableness and printability. For evaluation of resistance to corrosion, Block Error Rate (BLER) measurement was used, and for evaluation of slidableness, their friction forces were measured. As comparative examples, the same evaluation was made on magneto-optical discs which were different from the magneto-optical discs 1 according to the embodiment in thickness of the first protective layer 7, print layer 8 and second protective layer 9. Evaluation of the magneto-optical discs 1 were made on those just after being made (before warehousing) and those after warehousing for 1000 hours under an atmosphere having the temperature of 80° C. and the humidity of 85%. For BLER measurement, a MD evaluator OPS6200 (brand name) by Sony Techtronics was used, and measurement of frictional forces followed Rainbow Book as a MD standards paper.

Evaluation of magneto-optical discs 1 according to the embodiment is shown in Table 1, and evaluation of magneto-optical discs different in thicknesses from those according to the embodiment of the invention is shown in Table 2. Symbol a($\mu$m) is the thickness of the second protective layer 9, b($\mu$m) is the thickness of the print layer 8, and c($\mu$m) is the thickness of the first protective layer 7.

TABLE 1

| | Example 1 | Example 2 | Example 3 | Example 4 | Example 5 |
|---|---|---|---|---|---|
| a($\mu$m) | 6 | 6 | 7.5 | 10 | 5 |
| b($\mu$m) | 5 | 5 | 5 | 5 | 5 |
| c($\mu$m) | 2.5 | 2.0 | 2.5 | 2.5 | 2.5 |
| BLER (before warehousing) % | 0.02 | 0.02 | 0.03 | 0.03 | 0.02 |
| BLER (after warehousing) % | 0.04 | 0.8 | 0.03 | 0.03 | 0.05 |
| Frictional Force (mN) | 3 | 3 | 3 | 3 | 6 |
| printability | ○ | ○ | ○ | ○ | ○ |

TABLE 2

| | Comp. Example 1 | Comp. Example 2 | Comp. Example 3 |
|---|---|---|---|
| a($\mu$m) | 6 | 3 | 4 |
| b($\mu$m) | 5 | 5 | 5 |
| c($\mu$m) | 1.5 | 2.5 | 2.5 |
| BLER (before warehousing) % | 0.02 | 0.02 | 0.02 |
| BLER (after warehousing) % | 4 | 5 | 4 |

TABLE 2-continued

|  | Comp. Example 1 | Comp. Example 2 | Comp. Example 3 |
|---|---|---|---|
| Frictional Force (mN) | 3 | 12 | 7 |
| printability | ○ | ○ | ○ |

It is appreciated from comparison of Examples 1 through 5 of Table 1 with Comparative Examples 1 to 3 of Table that, when thickness a of the second protective layer 9 is no smaller than thickness b of the print layer 8, BLER before warehousing and BLER after warehousing are sufficiently small. It is also appreciated that frictional force is 3 mN in Examples 1 to 4 and 6 mN also in Example 5, and these values are sufficiently small for practical use. That is, it has been confirmed that magneto-optical discs 1 prepared to satisfy the relation $$a \geq b$$

between the thickness a of the second protective layer and the thickness of the print layer 8 exhibit excellent slidableness. This is because unevenness in level produced upon making the print layer 8 is more effectively masked by the second protective layer 9 having a thickness not smaller than thickness b of the print layer. Additionally, from Examples 3 and 4 using a larger thickness a for the second protective layer 9 as compared with Example 1, it is appreciated that, as the thickness a of the second protective layer 9 increases, difference between BLER before warehousing and BLER after warehousing decreases, and resistance to corrosion increases significantly.

Furthermore, from comparison between Example 1 of Table 1 and Comparative Examples 2 and 3 of Table 2, it is appreciated that, as the thickness a of the second protective layer 9 decreases, frictional force increases rapidly, and slidableness degrades significantly.

Moreover, since $a \geq b$ in Comparative Example 1, frictional force is as small as 3 mN, and a good slidableness is obtained. However, from comparison between this Comparative Example 1 and Examples 1 and 2 of Table 1, it is appreciated that, when $c<2$ μm, BLER after warehousing deteriorates significantly from BLER before warehousing. That is, it is appreciated that, when $c \geq 2$ μm, BLER is small before and after warehousing, and good resistance to corrosion can be ensured. Thus, it has been confirmed that thickness c of the first protective layer 7 is preferably $$c \geq 2 \text{ μm}$$

and by making the first protective layer 7 to satisfy that relation in thickness, resistance to corrosion can be improved.

As explained above, according to the embodiment, in the magneto-optical disc 1 contained in the cartridge 13, since the second protective layer 9 stacked on the print layer 8 has a thickness not smaller than the thickness of the print layer 8, the second protective layer 9 can effectively mask unevenness in level of the print layer 8. Therefore, good slidableness is ensured, and resistance to corrosion can be improved. Additionally, by stacking the first protective layer 7 to a thickness not less than 2 μm on the light reflecting layer 6, resistance to corrosion can be improved further. Therefore, the magneto-optical disc 1 ensures stable recording and reproduction while exhibiting sufficient resistance to corrosion and good slidableness, and makes it possible to give character information and design information by printing by using at least one surface of the magneto-optical disc 1.

Further, the invention is applicable to various recording mediums not limited to MD, which can be contained in cartridges, such as MD data (MD-DATA), MD data 2 (MD-DATA II), removable hard discs, in addition to MDs.

Additionally, the numerical values, materials and configuration of the cartridge, for example, which are proposed in the foregoing embodiment, are nothing but examples, and any other appropriate numerical values, materials and configuration of the cartridge may be employed.

Furthermore, although the foregoing embodiment has been explained as making the print layer 8 with a multicolor print by using at least two different colors, the print layer 8 may be formed to have a monochromatic print using a single color. In this case, thickness of the monochromatic print layer 8 is determined in the range from 1 to 3 μm. In case of using such a monochromatic print layer 8, a white base film may be provided for the purpose of increasing the color visibility.

Moreover, although the foregoing embodiment has been explained as making the first dielectric layer 3 and the second dielectric layer 5 of SiN, they may be made of any other appropriate material, such as zinc sulfide (ZnS), zirconium oxide ($ZrO_2$), yttrium ($Y_2O_3$), magnesium oxide (MgO), silicon oxide ($SiO_2$), magnesium fluoride ($MgF_2$), aluminum oxide (alumina: $Al_2O_3$), aluminum silicide nitride oxide (AlSiNO), hafnium oxide ($HfO_2$) or lithium fluoride (LiF), for example.

As described above, according to the invention, in a cartridge-contained recording medium made by stacking a first protective layer, print layer and second protective layer sequentially from a side nearer to a base body of the recording medium, by determining the thickness of the second protective layer to be not smaller than the thickness of the print layer, it is possible to ensure a sufficient resistance to corrosion of the recording medium and a good slidableness thereof even when a print is applied on at least one surface of the recording medium.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A cartridge-contained recording medium in which a recording medium is contained in a cartridge, said medium comprising a base body on which are stacked in sequence:
   a first dielectric layer;
   a signal recording layer;
   a second dielectric layer;
   a light reflecting layer;
   a first protective layer, a print layer;
   a print layer on which information can be printed; and
   a second protective layer, said second protective layer having a thickness not smaller than a thickness of said print layer and having at least a portion through which printed information on print layer can be perceived.

2. The cartridge-contained recording medium according to claim 1 wherein thickness of said first protective film is not less than 2 μm.

3. The cartridge-contained recording medium according to claim 1 wherein thickness of said second protective layer is in the range from 1.1 times to 2.0 times of thickness of said print layer.

4. The cartridge-contained recording medium according to claim 1 wherein thickness of said second protective layer is in the range from 1.2 times to 1.5 times of thickness of said print layer.

5. The cartridge-contained recording medium according to claim 1 wherein total thickness of said first protective layer, said print layer and said second protective layer is in the range from 12 $\mu$m to 20 $\mu$m.

6. The cartridge-contained recording medium according to claim 1 wherein at least two colors are used for said print layer, and thickness of said print layer is in the range from 3 $\mu$m to 8 $\mu$m.

7. The cartridge-contained recording medium according to claim 1 wherein a single color is used for said print layer, and thickness of said print layer is in the range from 1 $\mu$m to 3 $\mu$m.

* * * * *